US011062438B2

(12) United States Patent
Sakai et al.

(10) Patent No.: US 11,062,438 B2
(45) Date of Patent: Jul. 13, 2021

(54) EQUIPMENT MONITORING SYSTEM

(71) Applicant: KABUSHIKI KAISHA TOSHIBA, Minato-ku (JP)

(72) Inventors: Risa Sakai, Yokohama (JP); Wataru Yamada, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 92 days.

(21) Appl. No.: 16/565,669

(22) Filed: Sep. 10, 2019

(65) Prior Publication Data

US 2020/0005450 A1 Jan. 2, 2020

Related U.S. Application Data (63) Continuation of application No. PCT/JP2018/035338, filed on Sep. 25, 2018.

(30) Foreign Application Priority Data

Mar. 26, 2018 (JP) .............................. JP2018-057424

(51) Int. Cl.
*G06K 9/00* (2006.01)
*G06T 7/00* (2017.01)
(Continued)

(52) U.S. Cl.
CPC .......... *G06T 7/0004* (2013.01); *G06K 9/4609* (2013.01); *G06K 9/4671* (2013.01); *G06N 3/088* (2013.01)

(58) Field of Classification Search
CPC .. G06K 2209/19; G06K 9/4642; G06T 7/001; G06T 2207/10004; G06T 2207/20021;
(Continued)

(56) References Cited

U.S. PATENT DOCUMENTS

2006/0276934 A1* 12/2006 Nihei ..................... B25J 9/1679
700/245
2010/0091103 A1* 4/2010 Peltonen ................... E02F 9/26
348/82
(Continued)

FOREIGN PATENT DOCUMENTS

JP 4-6404 A 1/1992
JP 8-288642 A 11/1996
(Continued)

OTHER PUBLICATIONS

International Search Report dated Dec. 11, 2018 in PCT/JP2018/035338 (with English translation of categories of cited documents), 4 pages.

*Primary Examiner* — Li Liu
(74) *Attorney, Agent, or Firm* — Oblon, McClelland, Maier & Neustadt, L.L.P.

(57) ABSTRACT

According to one embodiment, an equipment monitoring system includes an imager and a processor. For an equipment repeating a first operation, the imager repeatedly acquires a first image of the equipment imaged at a first timing of the first operation. When a new first image is acquired, the processor determines an abnormality of the equipment included in the new first image based on multiple previous first images.

10 Claims, 7 Drawing Sheets (51) Int. Cl.
*G06K 9/46* (2006.01)
*G06N 3/08* (2006.01)

(58) Field of Classification Search
CPC . G06T 2207/30164; G06T 2207/30204; G06T 7/0004; G06T 7/74
See application file for complete search history.

(56) References Cited

U.S. PATENT DOCUMENTS

| | | | |
|---|---|---|---|
| 2012/0008839 A1* | 1/2012 | Hirota | G06T 7/0012 382/128 |
| 2012/0226382 A1* | 9/2012 | Asada | B25J 9/1605 700/259 |
| 2017/0243339 A1 | 8/2017 | Yamamoto et al. | |
| 2018/0197305 A1* | 7/2018 | Hostache | G06T 7/41 |
| 2018/0211372 A1* | 7/2018 | Kogawara | G01N 21/8806 |
| 2019/0352097 A1* | 11/2019 | Hou | B65G 43/02 |

FOREIGN PATENT DOCUMENTS

| | | |
|---|---|---|
| JP | 9-200734 A | 7/1997 |
| JP | 2007-222997 A | 9/2007 |
| JP | 2017-144532 A | 8/2017 |
| JP | 2017-215239 A | 12/2017 |

\* cited by examiner

EQUIPMENT MONITORING SYSTEM

CROSS-REFERENCE TO RELATED APPLICATIONS

This is a continuation application of International Application PCT/JP2018/035338, filed on Sep. 25, 2018. This application also claims priority to Japanese Patent Application No. 2018-057424, filed on Mar. 26, 2018. The entire contents of each are incorporated herein by reference.

FIELD

Embodiments described herein relate generally to an equipment monitoring system.

BACKGROUND

There is a system that monitors abnormalities of equipment when operating. For such an equipment monitoring system, it is desirable to develop technology that can determine abnormalities of the equipment more easily.

DETAILED DESCRIPTION

According to one embodiment, an equipment monitoring system includes an imager and a processor. For an equipment repeating a first operation, the imager repeatedly acquires a first image of the equipment imaged at a first timing of the first operation. When a new first image is acquired, the processor determines an abnormality of the equipment included in the new first image based on multiple previous first images.

Various embodiments are described below with reference to the accompanying drawings.

In the specification and drawings, components similar to those described previously or illustrated in an antecedent drawing are marked with like reference numerals, and a detailed description is omitted as appropriate.

Figure 1:
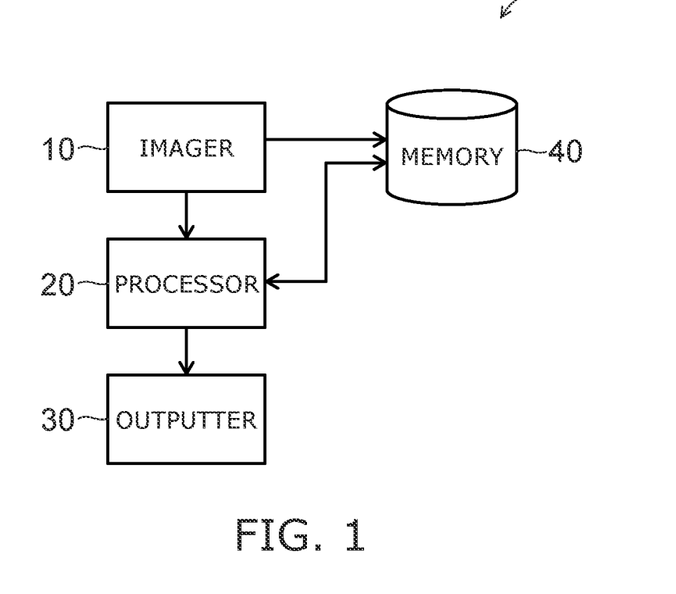
FIG. 1 is a block diagram illustrating the configuration of an equipment monitoring system according to an embodiment.

FIG. 1 is a block diagram illustrating the configuration of an equipment monitoring system according to an embodiment.

As illustrated in FIG. 1, the equipment monitoring system 1 according to the embodiment includes an imager 10, a processor 20, an outputter 30, and memory 40.

The equipment monitoring system 1 is used to monitor the equipment and check for the existence or absence of an abnormality. The abnormality includes, for example, a delay of a designated operation compared to the normal operation of the equipment, a change of a range of motion of a designated part of the equipment, a change of the position and/or the tilt of the workpiece that is processed, etc.

The imager 10 images the equipment repeating some first operation and acquires a still image. Specifically, the imager 10 repeatedly images the state of the equipment at a first timing when a first time has elapsed from when the equipment starts the first operation. The first image that illustrates the equipment at the first timing is repeatedly acquired thereby. The imager 10 stores the imaged images in the memory 40.

When the imager 10 acquires a new first image, the processor 20 refers to the memory 40 and acquires a previous first image. Based on multiple previous first images, the processor 20 determines whether or not there is an abnormality in the equipment included in the new first image. For example, the equipment is determined to be normal in the case where the state of the equipment imaged in the previous first image and the state of the equipment imaged in the new first image are substantially the same. The equipment is determined to be abnormal in the case where the state of the equipment inside the previous first image and the state of the equipment inside the new first image are much different.

For example, when the equipment is determined to be abnormal, the processor 20 transmits a signal to the equipment which is the monitoring object. The equipment stops the operation when receiving the signal. When the equipment is determined to be abnormal, the processor 20 may emit a notification to a preset registrant. Or, the processor 20 may transmit the determined result of abnormal to the outputter 30.

For example, the outputter 30 notifies that the equipment has an abnormality by emitting a sound, light, etc. The outputter 30 may cause the first image determined to be abnormal to be displayed or may transmit the first image to a preset recipient.

The imager 10 is, for example, a camera. The processor 20 includes a CPU (Central Processing Unit), memory, etc. The outputter 30 is, for example, a monitor, a printer, a speaker, lighting, etc.

According to the equipment monitoring system 1 according to the embodiment, the abnormality of the equipment is determined based on a comparison between the new first image and the multiple previous first images. It is unnecessary to prepare reference data for determining the abnormality of the equipment, etc. Accordingly, the equipment can be monitored more easily. For example, even for equipment that has just started to operate, the equipment monitoring system 1 is applicable without preparing reference data. The monitoring of the equipment can be started quickly compared to other methods. According to the equipment monitoring system 1, the equipment can be monitored in real time because the abnormality of the equipment is determined when the new first image is acquired.

The imager 10 may video-record the equipment. The processor 20 acquires the multiple first images by extracting a part of the video image. In such a case, the data amount becomes extremely large. Therefore, it is desirable for the imager 10 to acquire a still image by imaging the equipment at the first timing of the first operation. In other words, the imager 10 does not image the equipment in at least a part of the first operation other than the first timing. The data amount can be reduced by acquiring only the still image at the designated instant.

The imager 10 may further repeatedly image the equipment at another timing of the first operation. For example, the imager 10 acquires a second image and a third image by imaging the equipment at a second timing and a third timing of the first operation. The second timing is before the first timing. The third timing is before the second timing.

The processor 20 may perform the operations described above for the second image and the third image as well. In other words, when a new second image is acquired, the processor 20 may determine the abnormality of the equipment included in the new second image based on multiple previous second images. When a new third image is acquired, the processor 20 may determine the abnormality of the equipment included in the new third image based on multiple previous third images.

FIG. 2 to FIG. 7 are schematic views for describing the equipment monitoring system.

Details of the equipment monitoring system 1 will now be described with reference to FIG. 2 to FIG. 7.

Figure 2:
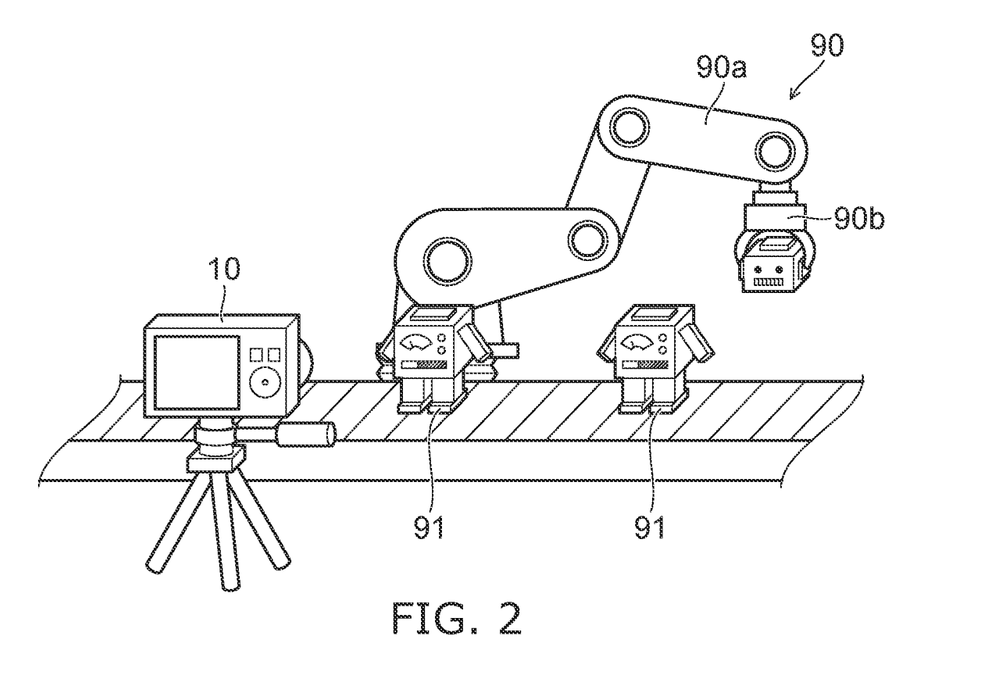
FIG. 2 is a schematic view for describing the equipment monitoring system.

In the example illustrated in FIG. 2, an equipment 90 processes a workpiece 91 moving on a conveyor. In the example, the workpiece 91 is a partly-finished workpiece partway through assembly. The imager 10 images the equipment 90 and the workpiece 91. Other subjects other than the workpiece and the equipment which is the monitoring object may be included in the image. However, to increase the precision of the monitoring, it is desirable for movement of the other subjects to be small or nil.

Figure 3A:
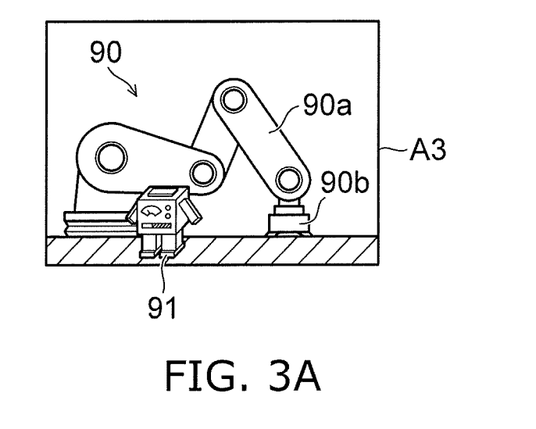
FIG. 3A to FIG. 3C are schematic views for describing the equipment monitoring system.
Figure 3B:
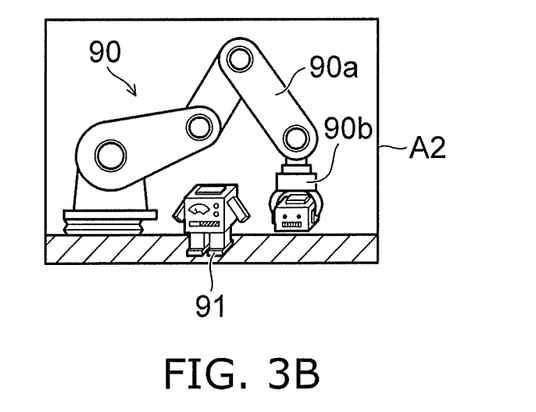
Figure 3C:
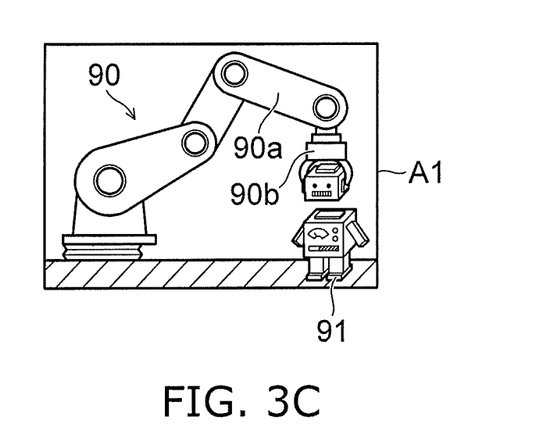

FIG. 3A to FIG. 3C illustrate images acquired by imaging the normal operation of the equipment 90. FIG. 3A to FIG. 3C respectively illustrate a third image A3, a second image A2, and a first image A1. The first to third images A1 to A3 are acquired by imaging the equipment 90 respectively at the first timing, the second timing, and the third timing of the first operation. The equipment 90 repeatedly performs the series of operations (the first operation) illustrated in FIG. 3A to FIG. 3C. Each time the first operation is performed, the imager 10 repeatedly images the equipment 90 and the workpiece 91 at the designated timing.

For example, the imager 10 receives a signal related to the operation of the equipment 90. The timing of imaging the equipment 90 is designated using the timing of receiving this signal as a reference. As an example, the imager 10 receives a control signal input to the equipment 90 when starting the first operation. The imager 10 uses the reception of the control signal as the starting point of the measurement of the time. The imager 10 images the equipment 90 at a designated timing after a prescribed length of time has elapsed from the starting point. Or, the imager 10 may image a video image of the equipment 90 and use, as the starting point of the measurement of the time, the point when the equipment 90 or the workpiece 91 reach a designated state.

Figure 4:
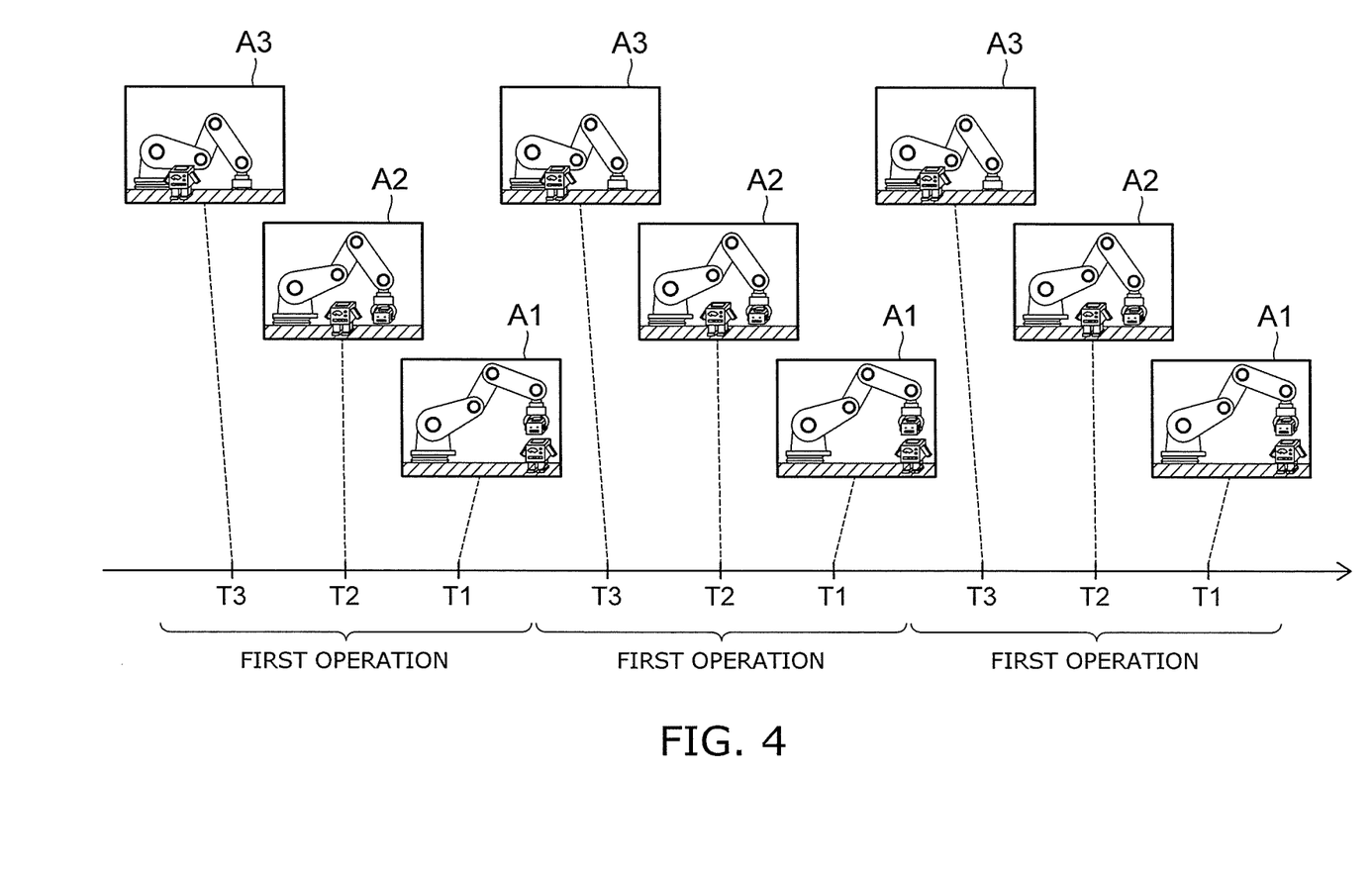
FIG. 4 is a schematic view for describing the equipment monitoring system.

In FIG. 4, the horizontal axis is a time T. For example, as illustrated in FIG. 4, the imager 10 images the equipment 90 and the workpiece 91 at a third timing T3, a second timing T2, and a first timing T1. Thereby, the third image A3, the second image A2, and the first image A1 of the equipment 90 and the workpiece 91 are acquired at each timing. The imaging is performed by the imager 10 each time the equipment 90 performs the first operation. As a result, the multiple first images A1, the multiple second images A2, and the multiple third images A3 are acquired as illustrated in FIG. 4.

A method for determining the abnormality of the equipment inside the first image A1 will now be described. The method described below also is applicable similarly to the determination of the abnormality of the equipment using the second image A2 and the determination of the abnormality of the equipment using the third image A3.

For example, the processor 20 performs unsupervised learning using the multiple first images A1. Principal component analysis, clustering, etc., can be used as a specific technique of the unsupervised learning. The processor 20 stores, in the memory 40, the model for determining the abnormality of the equipment inside the first image A1 generated by the unsupervised learning.

Figure 5A:
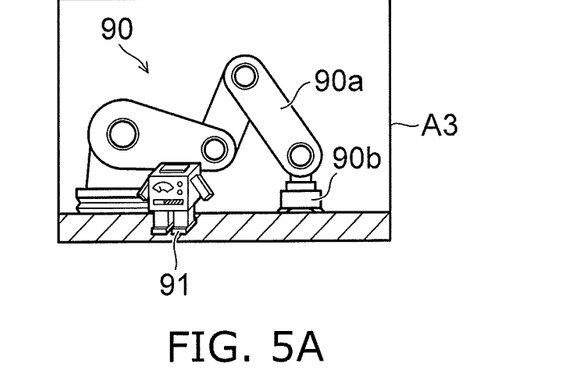
FIG. 5A to FIG. 5C are schematic views for describing the equipment monitoring system.
Figure 5B:
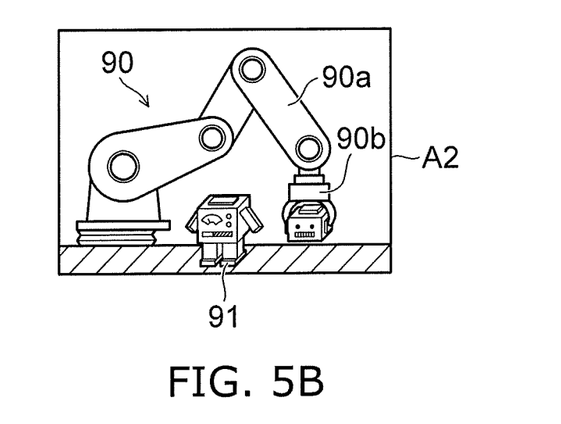
Figure 5C:
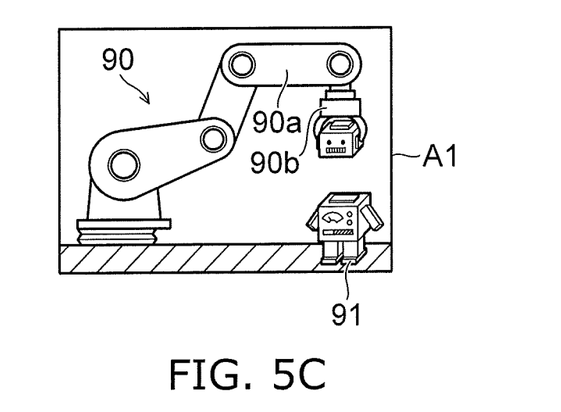

FIG. 5A to FIG. 5C illustrate the first operation in the case where an abnormality exists in the equipment 90. FIG. 5A and FIG. 5B are respectively the same as the operation when normal illustrated in FIG. 3A and FIG. 3B. The position (the angle) of an arm 90a and the position of a hand 90b of the equipment 90 in FIG. 5C are different from those of the state illustrated in FIG. 3C. The equipment monitoring system 1 detects such a change (an abnormality) of the operation of the equipment 90.

For example, the processor 20 calculates the difference of a feature between a new first image and one of multiple previous first images. The one of the multiple previous first images is, for example, the first image acquired directly before the new first image. For example, SIFT (Scale-Invariant Feature Transform), SURF (Speed-Upped Robust Feature), etc., can be used as the extraction method (the algorithm) of the feature. The processor 20 compares the calculated difference and a first threshold. When the difference exceeds the first threshold, the processor 20 determines that an abnormality exists in the equipment which is the subject of the new first image.

The first threshold is set based on feature data. For example, the average value and the standard deviation are calculated based on the previous feature data. $3\sigma$ is calculated and set as the first threshold. Using machine learning, the set first threshold and the feature based on the newly acquired first image are compared; and it is determined whether or not the feature is inside the threshold.

For example, the difference of the feature is small between the images illustrated in FIG. 3C. The positions of the arm 90a and the hand 90b are the much different between the image illustrated in FIG. 3C and the image illustrated in FIG. 5C. Therefore, the difference of the feature is large between these image; and the equipment 90 inside the image illustrated in FIG. 5C is determined to be abnormal.

The processor 20 may calculate the difference of the feature by performing mesh processing of the acquired first image. In the mesh processing, each image is split into multiple meshes; and the feature is calculated for each mesh. The processor 20 calculates each difference of the feature between the meshes corresponding between the new first image and the previous first image. The processor 20 determines the equipment to be abnormal in the case where the difference of the feature is not less than the first threshold for any of the meshes. By performing mesh processing of the first image, the location (the mesh) where the abnormality of the equipment occurs in the first image can be designated.

When the mesh processing of the first image is performed, the processor 20 may split the parts where movement of the subject is large into smaller meshes and may split the parts where movement of the subject is small (or nil) into larger meshes. Thereby, the feature can be weighted; and the change of the feature is detected easily. For example, the region inside the image where fine mesh processing is performed and the region inside the image where coarse mesh processing is performed are determined based on the change of the feature between the first image and the image directly before the first image.

For example, the processor 20 splits, into multiple meshes, the second image imaged at the nth (n=1, 2, 3, . . . ) second timing. The second timing is before the first timing. The processor 20 splits, into multiple meshes, the first image imaged at the nth first timing. The processor 20 calculates each difference of the feature between the meshes corresponding between the first image and the second image. A larger difference of the feature indicates that movement of the subject in the mesh is large.

The processor 20 merges the meshes having small differences of the feature and makes larger meshes. The processor 20 splits the meshes having large differences of the feature into pluralities and makes smaller meshes. Thereby, the feature can be weighted to be larger for the parts where movement of the subject is larger.

When determining the abnormality of the equipment, the processor 20 may utilize a signal generated by the equipment in addition to the first image. For example, it is taken that a change of a voltage value or a current value of the equipment 90 occurs in the equipment 90 when the arm 90a and the hand 90b are driven. In such a case, the processor 20 receives a signal indicating the voltage value or the current value of the equipment 90 from a sensor detecting the voltage value or the current value. The processor 20 compares the intensity of the received signal to a preset first range. For example, the processor 20 determines the equipment 90 to be abnormal in the case where the difference of the feature between the new first image and the previous first image exceeds the first threshold and the signal strength is outside the first range.

In the case where the abnormality occurs in the equipment, typically, an abnormality occurs also in the signal output from the equipment. The precision of the determination can be increased by determining the abnormality of the equipment based on the imaged image and the signal output from the equipment. Thereby, for example, the likelihood of determining an abnormality even though an abnormality has not occurred in the equipment can be reduced. Other than the voltage value and the current value, for example, the processor 20 may determine the abnormality of the equipment by utilizing a signal indicating a pressure, a gas flow rate, etc., of the equipment.

The case where the processor 20 calculates the difference of the feature is described above. Instead of this method, the processor 20 may calculate a similarity between the new first image and one of the multiple previous first images. The processor 20 compares the calculated similarity and a preset threshold. When the similarity is less than a threshold, the processor 20 determines that an abnormality exists in the equipment which is the subject of the new first image.

Or, the processor 20 may perform mesh processing of each of the multiple first images and may calculate each similarity between the corresponding meshes. When the mesh processing of the first image is performed, the processor 20 may change the size of the mesh according to the magnitude of the movement of the subject. In addition to the similarity, the processor 20 may use a signal generated by the equipment to determine the abnormality.

The output content of the outputter 30 can be modified as appropriate according to the processing of the processor 20. The outputter 30 may show specifically the location where the abnormality occurs in the first image. For example, in the case where the mesh processing of the first image is performed by the processor 20, the location (the mesh) where the abnormality occurs in the first image can be designated. The outputter 30 shows the location designated by the processor 20. Thereby, the user can easily ascertain which part of the equipment is determined to be abnormal by the equipment monitoring system 1.

When the equipment is determined to be abnormal, the processor 20 may determine the classification of the abnormality. This aspect is described with reference to FIG. 6 and FIG. 7 hereinbelow.

Figure 6A:
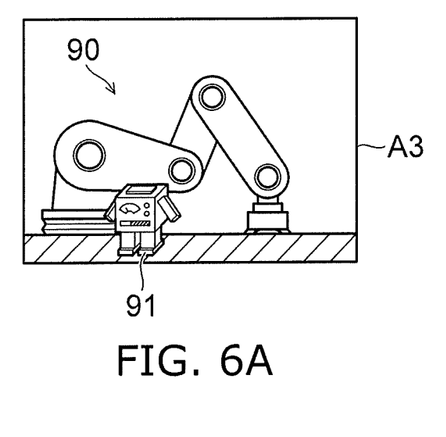
FIG. 6A to FIG. 6F are schematic views for describing the equipment monitoring system.
Figure 6B:
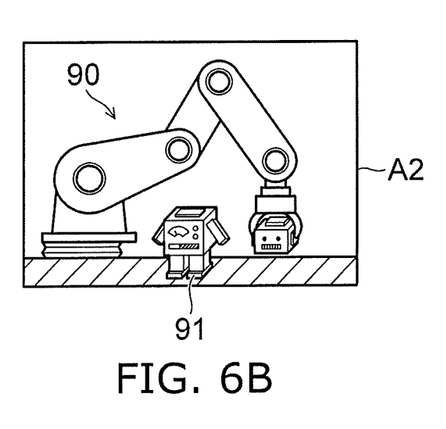
Figure 6C:
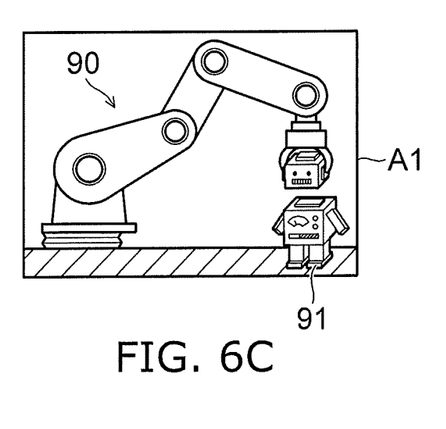
Figure 6D:
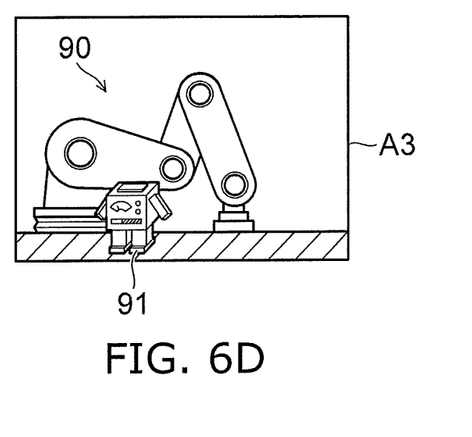
Figure 6E:
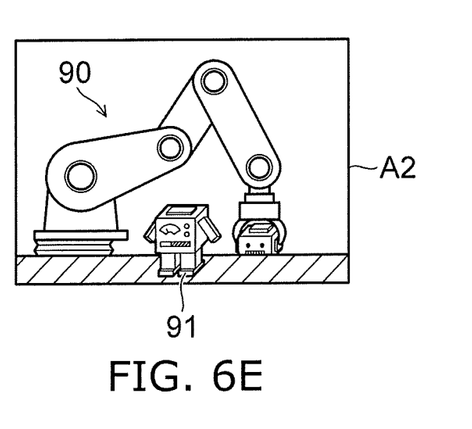
Figure 6F:
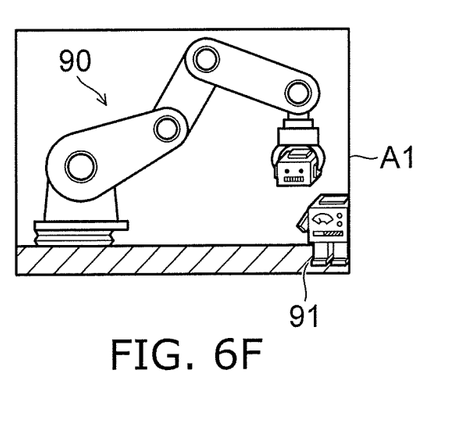

FIG. 6A to FIG. 6C illustrate the normal first operation. FIG. 6D to FIG. 6F illustrate the first operation in which at least a part is abnormal. FIG. 6A and FIG. 6D illustrate the third images A3 imaged at the same third timing T3. FIG. 6B and FIG. 6E illustrate the second images A2 imaged at the same second timing T2. FIG. 6C and FIG. 6F illustrate the first images A1 imaged at the same first timing T1.

The relative positional relationship between the hand 90b and the workpiece 91 is slightly different between the third images A3 of FIG. 6A and FIG. 6D and between the second images A2 of FIG. 6B and FIG. 6E. Comparing the first image A1 of FIG. 6C and the first image A1 of FIG. 6F, the relative positional relationship between the hand 90b and the workpiece 91 is much different. For example, the processor 20 determines the third image A3 and the second image A2 of FIG. 6D and FIG. 6E to be normal and determines the first image A1 of FIG. 6F to be abnormal.

When FIG. 6F is determined to be abnormal, the processor 20 refers to the third image A3 and the second image A2 of FIG. 6D and FIG. 6E imaged before FIG. 6F. The processor 20 calculates about how much the equipment inside the images of FIG. 6D and FIG. 6E respectively have shifted from the equipment inside the images of FIG. 6A and FIG. 6B. For example, the shift is represented by the difference of the feature.

Or, the processor 20 may refer to the calculation results when performing the abnormality determination of the third image A3 of FIG. 6D and the second image A2 of FIG. 6E. For example, the calculation results of the difference of the feature between the third images A3 of FIG. 6A and FIG. 6D and the difference of the feature between the second images A2 of FIG. 6B and FIG. 6E are stored in the memory 40. The processor 20 may refer to the calculation results.

From the calculation results, the processor 20 detects that a shift exists in the equipment 90 inside the images of FIG. 6D and FIG. 6E compared to the other normal images. In other words, it can be seen from the images of FIG. 6D and FIG. 6E that the operation of the equipment 90 is delayed slightly at each timing; the delay accumulates; and the first image A1 of FIG. 6F is determined to be abnormal. For example, such an abnormality is classified as a delay of the operation of the equipment.

Figure 7A:
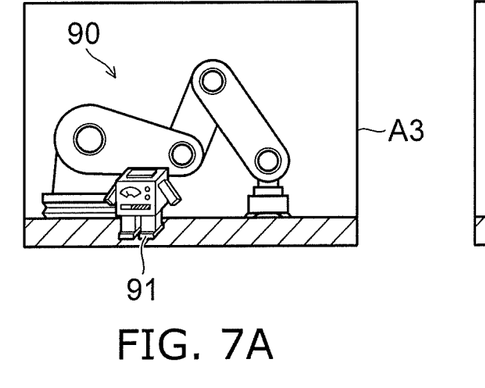
FIG. 7A to FIG. 7F are schematic views for describing the equipment monitoring system.
Figure 7B:
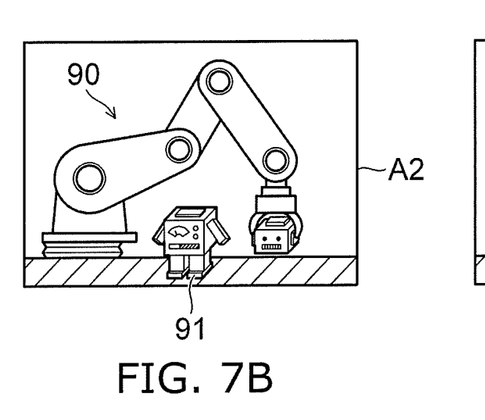
Figure 7C:
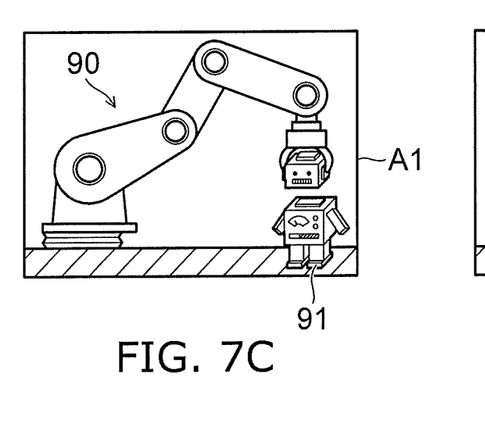
Figure 7D:
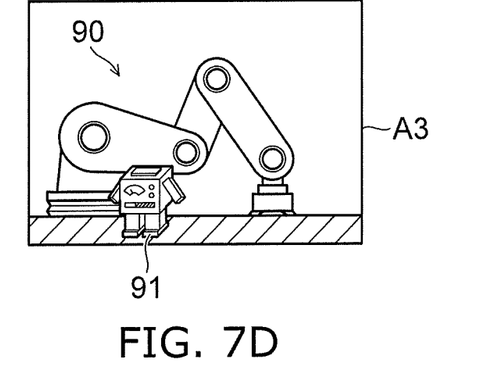
Figure 7E:
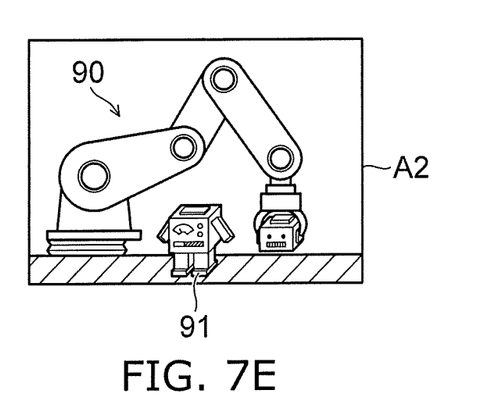
Figure 7F:
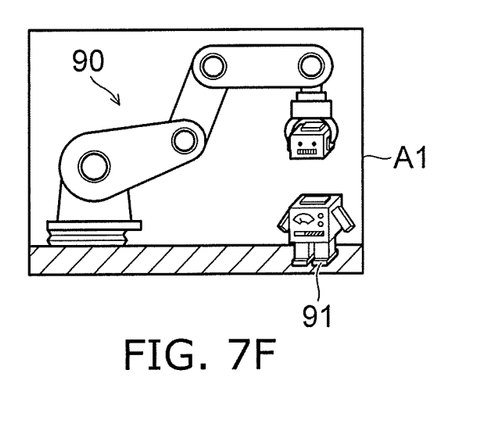

FIG. 7A to FIG. 7C illustrate the normal first operation. FIG. 7D to FIG. 7F illustrate the first operation in which at least a part is abnormal. FIG. 7A to FIG. 7C illustrate the normal first operation. FIG. 7D to FIG. 7F illustrate the first operation in which at least a part is abnormal. FIG. 7A and FIG. 7D illustrate the third images A3 imaged at the same third timing T3. FIG. 7B and FIG. 7E illustrate the second images A2 imaged at the same second timing T2. FIG. 7C and FIG. 7F illustrate the first images A1 imaged at the same first timing T1.

The relative positional relationship between the hand 90b and the workpiece 91 is the same between the third images A3 of FIG. 7A and FIG. 7D and between the second images A2 of FIG. 7B and FIG. 7E. On the other hand, comparing FIG. 7C and FIG. 7F, the relative positional relationship between the hand 90b and the workpiece 91 is much different. The processor 20 determines the third image A3 of FIG. 7D and the second image A2 of FIG. 7E to be normal and determines the first image A1 of FIG. 7F to be abnormal.

When the first image A1 of FIG. 7F is determined to be abnormal, as described above, the processor 20 refers to the third image A3 of FIG. 7D and the second image A2 of FIG. 7E. The processor 20 compares the subjects inside the images of FIG. 7D and FIG. 7E respectively to the subjects inside the images of FIG. 7A and FIG. 7B.

From the result of the comparison, it is detected that compared to the other normal images, the shifts of the third image A3 of FIG. 7D and the second image A2 of FIG. 7E are sufficiently small. In other words, the operation (the position) of the equipment 90 is much different only at the first timing T1 when the first image A1 of FIG. 7F is imaged. For example, due to some cause, the equipment 90 cannot change from the state illustrated in FIG. 7B to the state illustrated in FIG. 7C; and it is considered that the range of motion has changed. For example, such an abnormality is classified as a change of the range of motion of the equipment 90.

Restating the example described above, for example, for the nth first operation, the equipment inside the first image imaged at the first timing is determined to be abnormal by the processor 20. The processor 20 determines the classification of the abnormality based on the comparison result between the second image imaged at the second timing in the nth first operation and the second image imaged at the second timing in the (n-1)th first operation. For example, the processor 20 determines that an abnormality of a first classification has occurred in the case where the difference of the feature between the second image of the nth first operation and the second image of the (n-1)th first operation is less than the first threshold and exceeds a second threshold. The first classification is the delay of the operation of the equipment. The processor 20 determines that an abnormality of a second classification has occurred in the case where the difference of the feature is less than the second threshold. The second classification is the change of the range of motion of the equipment. The processor 20 outputs the classification of the abnormality to the user.

In addition to the classification of the abnormality, the processor 20 may output the first image and the second image of the nth first operation. By outputting the second image determined to be normal in addition to the first image determined to be abnormal, the user easily ascertains the details of the abnormality. The processor 20 may further output the time that the first image is imaged, the time from the start of the first operation, etc.

The processor 20 may provide a marker at the location determined to be abnormal in the first image and may provide a marker at a location in the second image that may be associated with the abnormality of the first image. Thereby, the user ascertains the details of the abnormality more easily.

Figure 8:
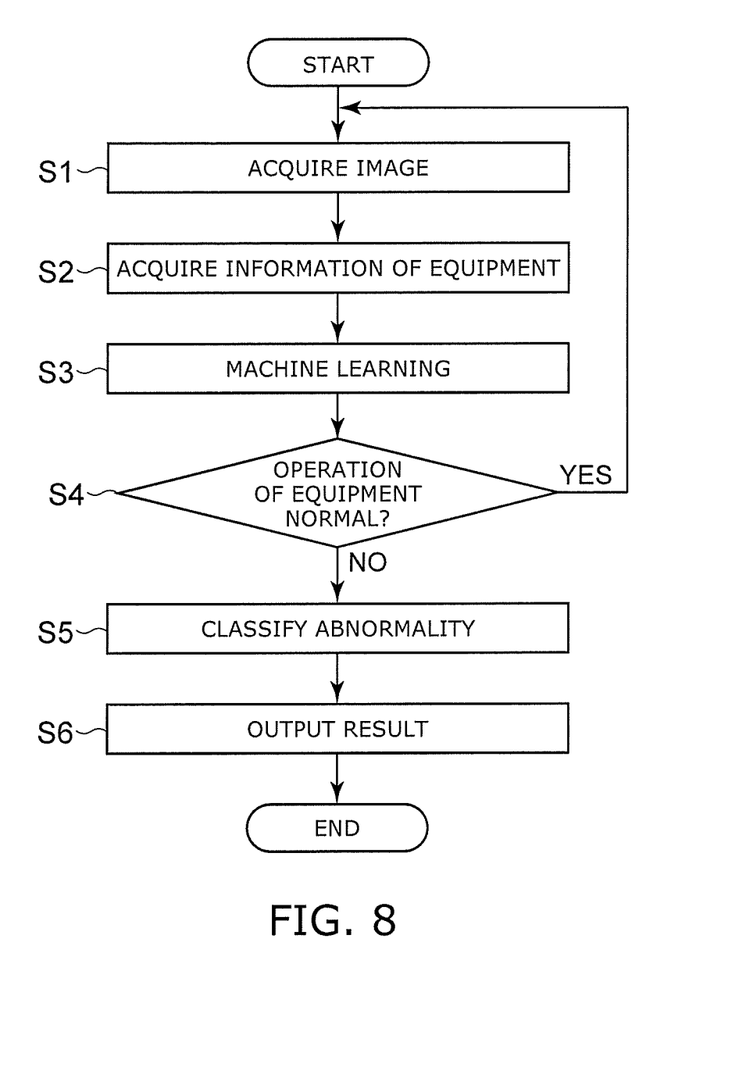
FIG. 8 is a flowchart illustrating an example of the operation of the equipment monitoring system according to the embodiment.

FIG. 8 is a flowchart illustrating an example of the operation of the equipment monitoring system according to the embodiment.

The imager 10 repeatedly acquires the first image of the equipment imaged at the first timing of the first operation for the equipment repeating the first operation (step S1). The processor 20 acquires information relating to the operation of the equipment which is the monitoring object (step S2). The information is, for example, a signal output from the equipment. The processor 20 compares the new first image to the multiple previous first images and performs machine learning (step S3). The processor 20 determines whether or not the operation of the equipment is normal based on the information relating to the operation of the equipment and the comparison result between the new first image and the multiple previous first images (step S4).

When the operation of the equipment is determined to be normal, step S1 is performed again. When the operation of the equipment is determined to be abnormal, the processor 20 classifies the abnormality (step S5). For example, the processor 20 outputs the classification of the abnormality and the first image determined to be abnormal (step S6).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. An equipment monitoring system, comprising:
   an imager repeatedly acquiring a first image of an equipment and repeatedly acquiring a second image of the equipment, the equipment repeating a first operation, the first image being of the equipment imaged at a first timing of the first operation, the second image being of the equipment imaged at a second timing of the first operation, the second timing being before the first timing; and
   a processor determining an abnormality of the equipment imaged in a new first image when the new first image is acquired, the determining being based on a plurality of previous first images, wherein
   the processor:
      splits the new first image into a plurality of meshes and splits the second image directly before the new first image into a plurality of meshes,
      calculates each difference of a feature between corresponding meshes of the new first image and the second image directly before the new first image, and
      for the plurality of meshes included in the new first image, merges the meshes of which the difference is relatively small, and splits into pluralities the meshes of which the difference is relatively large.

2. The equipment monitoring system according to claim 1, wherein the processor
   detects a first signal of the equipment related to the first operation, and
   determines, based on the difference and an intensity of the signal, whether the equipment imaged in the new first image is abnormal.

3. The equipment monitoring system according to claim 1, wherein the processor:
   splits the one of the plurality of previous first images into a plurality of meshes,
   calculates each difference of the feature between the corresponding meshes of the new first image and the one of the plurality of previous first images, and
   determines the equipment imaged in the new first image to be abnormal in the case where any of the differences exceeds a first threshold.

4. The equipment monitoring system according to claim 1, therein the processor transmits a signal to the equipment when the equipment imaged in the new first image is determined to be abnormal.

5. The equipment monitoring system according to claim 1, wherein the processor outputs the new first image when the equipment imaged in the new first image is determined to be abnormal.

6. The equipment monitoring system according to claim 1, wherein
the imager repeatedly acquires a second image of the equipment imaged at a second timing before the first timing of the first operation, and
when the equipment imaged in the new first image is determined to be abnormal, the processor classifies the abnormality based on a comparison result between the second image directly before the new first image and an other previous one of the second images.

7. The equipment monitoring system according to claim 6, wherein
when the equipment imaged in the new first image is determined to be abnormal, the processor outputs the new first image and the classification of the abnormality.

8. The equipment monitoring system according to claim 7, wherein the processor further outputs the second image directly before the new first image.

9. The equipment monitoring system according to claim 5, wherein the processor provides a marker indicating the abnormality in a part of the new first image and outputs the new first image.

10. The equipment monitoring system according to claim 1, wherein the imager does not image the equipment in at least a part of the first operation other than the first timing.

* * * * *